US007388344B2

(12) United States Patent
Koyama et al.

(10) Patent No.: US 7,388,344 B2
(45) Date of Patent: Jun. 17, 2008

(54) MULTICHANNEL PULSE TRAIN TRANSMITTING APPARATUS

(75) Inventors: Junji Koyama, Azumino (JP); Naoki Kanayama, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 29 days.

(21) Appl. No.: 11/613,405

(22) Filed: Dec. 20, 2006

(65) Prior Publication Data

US 2007/0170883 A1 Jul. 26, 2007

(30) Foreign Application Priority Data

Jan. 20, 2006 (JP) ............................ 2006-011922

(51) Int. Cl.
*G05B 11/32* (2006.01)

(52) U.S. Cl. ................ 318/625; 318/560; 318/568.11; 318/34

(58) Field of Classification Search ............... 318/625, 318/34
See application file for complete search history.

(56) References Cited

U.S. PATENT DOCUMENTS 3,764,868 A * 10/1973 O'Callaghan ............... 318/85
4,555,689 A * 11/1985 Brick et al. ................ 187/393
4,977,359 A * 12/1990 Sawai et al. ............... 318/561
6,548,981 B1 * 4/2003 Ishii et al. ................ 318/538

FOREIGN PATENT DOCUMENTS

JP 2002-366210 * 8/2001
JP 2002-171781 A 6/2002
JP 2002-366210 A 12/2002
JP 2004-334551 A 11/2004

* cited by examiner

*Primary Examiner*—Rita Leykin
(74) *Attorney, Agent, or Firm*—Buchanan Ingersoll & Rooney PC

(57) ABSTRACT

In the multi-shaft driving apparatus, position command pulse trains for servomotors are generated from a motor controller and supplied to motor drivers for the respective servomotors via a multichannel pulse train transmitting apparatus. The multichannel pulse train transmitting apparatus converts the position command pulse trains supplied from the motor controller 6 to serial signals in a transmission-side converter, combines the resulting serial signals as a stream signal, and supplies the signal to a reception-side converter via a serial signal transmission path composed of a pair of signal wires. In the reception-side converter, motor position command pulse trains in the form of a serial signal is returned to multichannel pulse trains in the form of a parallel signal which are supplied to the motor drivers. The number of wires between the motor controller and the motor drivers can be reduced.

1 Claim, 1 Drawing Sheet

MULTICHANNEL PULSE TRAIN TRANSMITTING APPARATUS

BACKGROUND OF THE INVENTION

1. Field of the Invention

The present invention relates to a multi-shaft driving apparatus comprising a plurality of motors for driving an articulated robotic hand or another plurality of operational shafts. More specifically, the present invention relates to a multichannel pulse train transmitting apparatus whereby the number of wires can be reduced in a multichannel pulse train transmission path for presenting a motor position command pulse train from a motor controller in the multi-shaft driving apparatus to motor drivers.

2. Description of the Related Art

In an articulated robotic hand or other multi-shaft driving apparatus, a plurality of motors, e.g., servo motors, are provided for driving the operational shafts; and position-detecting devices, e.g., rotary encoders, for detecting the rotation positions of the servomotors are attached to the servomotors. Based on a position command provided from a host computer or other device, and on an actual rotation position of the servo motors that is based on the detection signal from the rotary encoders, the motor controller of the multi-shaft driving apparatus generates motor position command pulses for controlling the driving of the servo motors, and presents the pulses to the motor drivers for controlling the driving of the servo motors.

A multichannel pulse train transmission path for presenting the position command pulse from the motor controller to the motor drivers is required in such a multi-shaft driving apparatus comprising a plurality of motors. When the number of motors increases, the number of channels (and therefore the number of signal wires) of the multichannel pulse train transmission path accordingly increases as well. If the number of signal wires can be reduced, the space through which the wires are extended need not be copious, wiring will be simplified, and the probability of wire breakage will be reduced.

DeviceNet, CAN, and various other standards for economizing on wiring between controllers and drivers are known. However, when these standards are used, a constraint is presented in that the driver must operate in accordance with the communication standard.

A configuration wherein communication between the controller and driver is performed using serial communication is disclosed in JP-A 2004-334551, JP-A 2002-366210, and JP-A 2002-171781. However, the method disclosed in JP-A 2004-334551 presupposes a configuration wherein the controllers and drivers correspond on a one-to-one basis, and is incompatible with the transmissions of a multichannel pulse train. The method disclosed in JP-A 2002-366210 presupposes a PC-based configuration that is compatible with serial communication. The method is used to transmit a pulse train position command, which is a command that transfers from a controller to a general motor driver, in only one direction. The method disclosed in JP-A 2002-171781 relates to serial communication between a controller and a PC, and does not relate to communication between a controller and a plurality of motor drivers.

SUMMARY OF THE INVENTION

An object of the present invention is to provide a multichannel pulse train transmitting apparatus whereby the number of wires of a multichannel pulse train transmission path, used for transmitting a motor position command pulse from a controller to a plurality of motor drivers in a multi-shaft driving apparatus, can be reduced without changing the controller and motor driver.

To achieve the above-mentioned object, the present invention provides a multichannel pulse train transmitting apparatus for transmitting a motor position command pulse from a motor controller to motor drivers for controlling the driving of each of a plurality of motors, the apparatus comprising:

a transmission-side converter provided with a serialization circuit;

a reception-side converter provided with a deserialization circuit;

controller-side multichannel parallel signal transmission paths for connecting the motor controller and the transmission-side converter;

driver-side multichannel parallel signal transmission paths for connecting the reception-side converter and the motor drivers; and a serial signal transmission path for connecting the transmission-side converter and the reception-side converter; wherein the transmission-side converter collects motor position command pulse trains for the motors that are provided from the controller via the controller-side multichannel parallel signal transmission paths, converts the motor position command pulse trains to a serial signal, and provides the serial signal to the reception-side converter via the serial transmission path; and the reception-side converter returns the received serial-form motor position command pulse train to multichannel pulse trains in the form of a parallel signal and provides the multichannel pulse trains to the motor drivers via the driver-side multichannel parallel signal transmission path.

In the multichannel pulse train transmitting apparatus of the present invention, position command pulse trains to the motors that are output from the motor driver are collected and converted to a serial signal using a signal converter called a SERDES (serialization/deserialization), and the converted serial signal is once again returned to the original multichannel position command pulse trains.

Therefore, communication between the transmission-side converter connected to the controller, and the reception-side converter connected to the motor drivers can be performed by serial communication. Accordingly, the number of communication wires in these spaces can be reduced, and a need to increase the number of signal wires does not arise even if the number of motor drivers increases.

DESCRIPTION OF THE PREFERRED EMBODIMENTS

Figure 1:
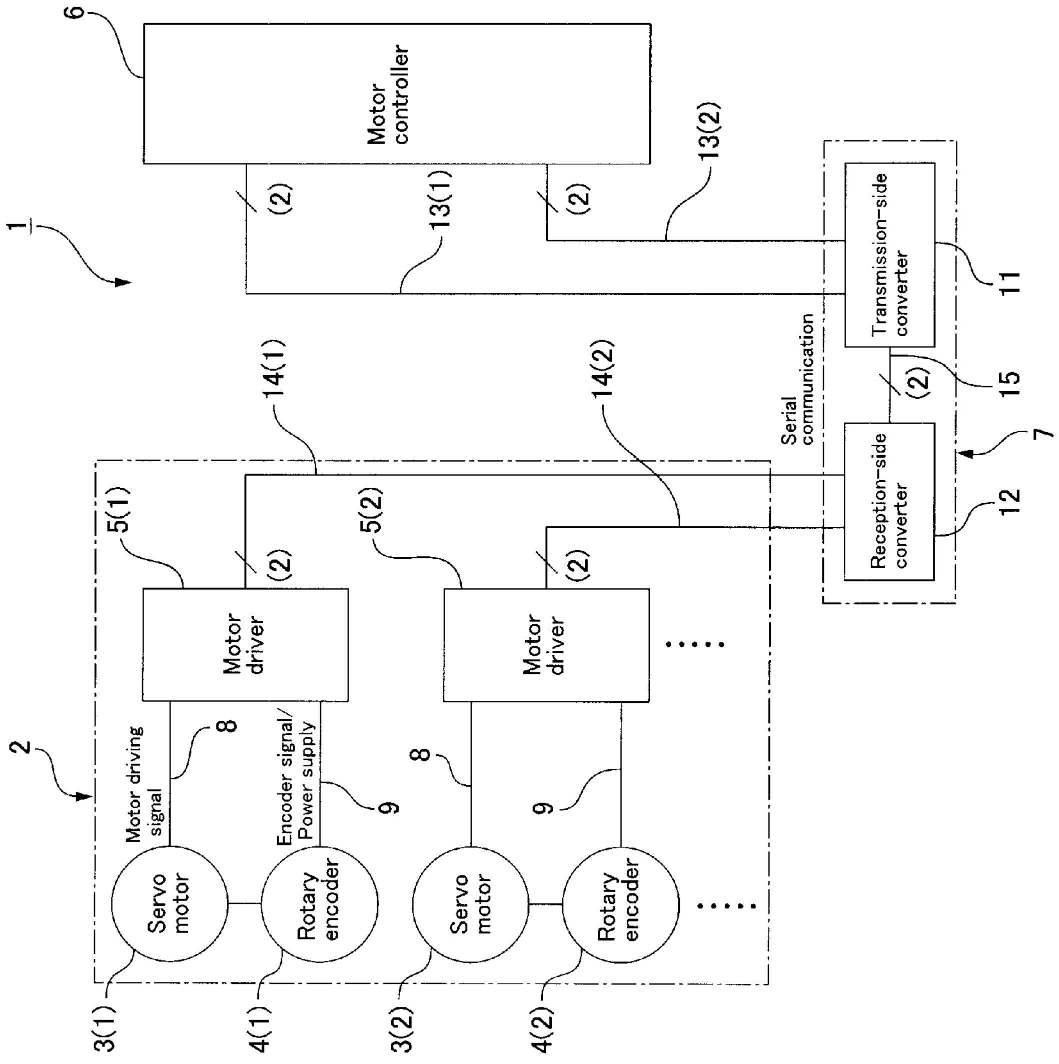
FIG. 1 is a schematic block diagram of a multi-shaft driving apparatus in which the present invention is employed.

An embodiment of a multi-shaft driving apparatus in which the present invention is employed will be described with reference to the drawing.

FIG. 1 is a schematic block diagram showing a multi-shaft driving apparatus in which the present invention is employed and which can be used in an articulated robotic hand or other device. In the multi-shaft driving apparatus 1 of the present example, a plurality of servomotors 3(1), 3(2) . . . , rotary encoders 4(1), 4(2) . . . attached to the servomotors 3(1), 3(2) . . . , and motor divers 5(1), 5(2) . . . for controlling the driving of the servomotors 3(1), 3(2) . . . are disposed in a drive-side mechanism 2. The multi-shaft driving apparatus 1 also has a motor controller 6 for generating position command pulses that are supplied to the motor drivers 5(1), 5(2). . . , and a multichannel pulse train transmitting apparatus 7 for transmitting the position command pulses to the motor drivers 5(1), 5(2) . . .

The motor drivers 5(1), 5(2) . . . and the servomotors 3(1), 3(2) . . . are connected via a motor driving signal supply path 8. The motor drivers 5(1), 5(2) . . . and rotary encoders 4(1), 4(2) . . . are connected by a parallel signal supply path 9 that includes an encoder signal wire and a power source line.

The multichannel pulse train transmitting apparatus 7 comprises a transmission-side converter 111 provided with a serialization circuit that is connected to the motor controller 6, and a reception-side converter 12 provided with a deserialization circuit that is connected to the motor drivers 5(1), 5(2) . . . . The motor controller 6 and transmission-side converter 11 are connected via controller-side multichannel parallel signal transmission paths 13(1), 13(2) . . . . The reception-side converter 12 and motor drivers 5(1), 5(2) . . . are connected in the same manner via driver-side multichannel parallel signal transmission paths 14(1), 14(2) . . . In contrast, the transmission-side converter 11 and reception-side converter 12 are connected via a serial signal transmission path 15.

In the example shown in the drawing, the controller-side multichannel parallel signal transmission paths 13(1), 13(2) . . . and driver-side multichannel parallel signal transmission paths 14(1), 14(2) . . . each include two command signal wires. The serial signal transmission path 15 includes a pair of signal wires (two signal wires). The number of wires is not limited to two.

In the multi-shaft driving apparatus 1 of this configuration, the position command pulse trains to the servomotors 3(1), 3(2) . . . that are generated in the motor controller 6 are supplied to the motor drivers 5(1), 5(2) . . . via the multichannel pulse train transmitting apparatus 7.

In the multichannel pulse train transmitting apparatus 7, the position command pulse trains supplied via the controller-side multichannel parallel signal transmission paths 13(1), 13(2) . . . are converted to serial signals in the transmission-side converter 11, collected as a stream signal, and supplied to the reception-side converter 12 via the serial signal transmission path 15, which is composed of a pair of signal wires. In the reception-side converter 12, the received motor position command pulse trains in the form of a serial signal are returned to multichannel pulse trains in the form of a parallel signal, and are supplied to the motor drivers 5(1), 5(2) . . . via the driver-side multichannel parallel signal transmission paths 14(1), 14(2) . . . , respectively.

Therefore, in the multichannel driving apparatus 1 of the present example, the signal transmission path between the motor controller 6 and motor drivers 5(1), 5(2) . . . of the drive-side mechanism 2 can be formed as the serial signal transmission path 15, which is composed of two signal wires, by providing the multichannel pulse train transmitting apparatus 7. The number of wires of the transmission path therebetween can therefore be reduced. For this reason, the configuration of the circuits of the motor controller 6 or the motor drivers 5(1), 5(2) . . . does not have to be changed.

In the present example, an electrical wire was used as the transmission path for the serialized position command pulse train. However, it is also possible to convert a digital signal to an optical signal, and either use an optical transmission path in which an optical fiber is used or a wireless optical path in which infrared light or a laser is used.

What is claimed is:

1. A multichannel pulse train transmitting apparatus for transmitting motor position command pulses from a motor controller to motor drivers for controlling the driving of each of a plurality of motors, said apparatus comprising:

a transmission-side converter provided with a serialization circuit;

a reception-side converter provided with a deserialization circuit;

controller-side multichannel parallel signal transmission paths for connecting the motor controller and the transmission-side converter;

driver-side multichannel parallel signal transmission paths for connecting the reception-side converter and the motor drivers; and a serial signal transmission path for connecting the transmission-side converter and the reception-side converter; wherein the transmission-side converter collects motor position command pulse trains for the respective motors that are provided from the controller via the controller-side multichannel parallel signal transmission paths, converts the pulse trains to serial signals, and supplies the resulting serial signals to the reception-side converter via the serial transmission path; and the reception-side converter returns the received serial-form motor position command pulse trains to multichannel pulse trains in the form of a parallel signal and supplies the resulting parallel signals to the motor drivers via the driver-side multichannel parallel signal transmission paths.

* * * * *